United States Patent [19]

[11] 4,012,355

Nimerick

[45] Mar. 15, 1977

[54] COMPOSITION USEFUL IN PREVENTING ENVIRONMENTAL EROSION CONTAINING FILM FORMING ORGANIC POLYMER AND SILICONE

[75] Inventor: Kenneth H. Nimerick, Tulsa, Okla.

[73] Assignee: The Dow Chemical Company, Midland, Mich.

[22] Filed: July 23, 1975

[21] Appl. No.: 598,524

Related U.S. Application Data

[60] Division of Ser. No. 427,609, Dec. 26, 1973, which is a continuation-in-part of Ser. No. 306,998, Nov. 16, 1972, abandoned.

[52] U.S. Cl. .................. 260/29.7 NR; 260/29.6 R; 260/29.6 NR

[51] Int. Cl.[2] ......................................... C08L 25/10

[58] Field of Search ........... 260/29.7 NR, 29.6 NR, 260/29.6 R, 29.1 SB, 29.2 M, 827, 29.7 T

[56] References Cited

UNITED STATES PATENTS

| | | | |
|---|---|---|---|
| 2,507,200 | 5/1950 | Elliott et al. | 427/341 |
| 2,739,910 | 3/1956 | McGarvey | 260/29.6 R |
| 2,854,347 | 9/1958 | Booth et al. | 428/403 |
| 2,923,095 | 2/1960 | Maginel-Pelonnier et al. | 260/29.2 M |

FOREIGN PATENTS OR APPLICATIONS

| | | | |
|---|---|---|---|
| 673,067 | 10/1963 | Canada | 260/29.6 NR |

OTHER PUBLICATIONS

Grant (ed), Hackh's Chemical Dictionary, McGraw-Hill, N.Y., 1969, p. 611.

*Primary Examiner*—M. J. Welsh
*Attorney, Agent, or Firm*—Bruce M. Kanuch

[57] ABSTRACT

The surface of a mass of finely divided particulate matter, e.g. the surface of a coal pile, is treated by applying to the surface a combination of an organic polymer latex and a silicone to provide a water repellant surface.

11 Claims, No Drawings

COMPOSITION USEFUL IN PREVENTING ENVIRONMENTAL EROSION CONTAINING FILM FORMING ORGANIC POLYMER AND SILICONE

CROSS REFERENCE TO RELATED APPLICATIONS

This application is a divisional of application Ser. No. 427,609, filed Dec. 26, 1973, which is a continuation-in-part of now abandoned Ser. No. 306,998, filed Nov. 16, 1972.

BACKGROUND OF THE INVENTION

The present invention relates broadly to the protection of particulate materials from erosion and water infusion. More specifically the invention is directed to the application of a surface coating agent to the surface of particulate materials to effect water and wind resistance.

Wind erosion of exposed masses of particulate matter such as coal, ore, and mine mill tailings causes both air pollution and economic waste. Detrimental effects on health and cleanliness of the home result when these fine particles are carried aloft on the winds. When valuable minerals are eroded, economic loss may be substantial.

Water causes undesirable effects both by erosion and by water infusion which would lead to undesired caking of particles into bulky masses which are hard to convey. Conveying methods are impeded by the size of these cakings. For example, the unloading of railroad coal cars through their hopper doors is often made virtually impossible by caking of the coal so extensive as to block the openings in the base of the hopper.

One approach employed to prevent wind erosion is the use of a device known as a water buggy, which sprays water on the dry areas of the accumulation. The operation is very expensive and may lead to the agglomeration problem noted above.

Silicone resins have been used to reduce water absorption and to improve adhesion and resistance to weathering of concrete walls and drives, ceramic and stone surfaces, asphalt, foam and mat insulation, glass beads, asbestos shingles, and decorative tile.

These silicon resins have not been successfully applied to mineral piles, particularly those of carbonaceous matter. The surfaces of these piles contain loose material which is subject to water and wind erosion. Silicone resins applied to reduce water absorption do not bind these loose particles together. The treated surface is therefore subject to erosion which removes the silicone coated particles thereby destroying the ability to reduce water absorption.

U.S. Pat. No. 2,854,347 shows the use of elastomeric substances such as synthetic polymers in latex form to coat the surfaces of minerals.

SUMMARY OF THE INVENTION

The invention comprises treating, e.g. by spraying, the surface of a mass of particulate matter with both an organic polymer latex and a silicone. It is found that advantageous results are obtained by first applying the latex to bind the particles and then applying the silicone.

DESCRIPTION OF A PREFERRED EMBODIMENT

Organic polymer latexes finding use in this invention are selected from those which form a substantially water insoluble film at temperatures preferably ranging from about 40° to about 80° F. By film forming is meant the ability to form continuous films by deposition of the latex on a substrate followed by air drying. Film formabilty is dependent on a number of parameters. Herein the property means that polymer particles are soft enough to coalesce under the forces that arise in the air drying of a latex film and are capable of binding the particles at the surface into a continuous coherent crust.

Typical organic polymer latexes useful herein include those of the interpolymers of alkenyl aromatic monomers, such as styrene and vinyl toluene, with open chain conjugated diolefins, such as butadiene and isoprene optionally with at least one other ethylenically unsaturated monomer, such as acrylic or methacrylic acid, an alkyl acrylate or like monomer. As is generally known the film forming latexes for use herein are those of interpolymers containing no more than about 80 weight per cent of the alkenyl aromatic monomer. Other useful latexes are those of polyolefins such as polyisobutylene, polyisoprene and the like. Also polyvinyl alkanoates, such as polyvinyl acetate and polyvinyl propionate may be employed. The various polymers of the alkyl acrylates and methacrylates that are film forming also may be used. Also, the polymers suggested in U.S. Pat. No. 2,854,347 may be used, and the teachings of said patent specifically incorporated herein by reference. It is a simple task for the skilled worker to identify a useful polymer latex from the multitude that are available. Routine experiments will demonstrate the film formability of a given latex.

The latex may be post stabilized to prevent premature coagulation by the incorporation of an additional wetting agent in addition to one used in making the latexes. The wetting agent and its amount to achieve the desired stability will depend in large measure on the particular latex and to the materials to which the latex is applied. It is generally accepted that nonionic wetting agents represent a desirable class of latex stabilizers and accordingly are preferred for use herein. Typical of such non-ionic wetting agents are those condensation products of a polyoxyalkylene chain of from 5 to about 40 or more oxyalkylene recurring units with an alcohol or phenol. Representative species are the adducts of one mole of di-sec-butylphenol with 10 moles ethylene oxide or one mole of nonyl phenol with 9 moles ethylene oxide. Other useful species may be identified by reference to standard texts on wetting agents.

When employed, the post stabilizing wetting agent should be present in an amount of from about 0.1 to about 32 weight per cent of the solids of the latex composition.

The actual amount used should be the minimum needed to achieve the desired stability.

The added wetting agent also enhances the wetting of the mineral particles by the latex thereby increasing the depth of penetration of the latex into the mass of particulate materials. This is particularly important when the surface to be coated is extremely oily as, for example, is the case with green petroleum coke.

The latex may also contain from about 1 to about 10 weight per cent of the latex composition of an antifreeze agent to permit usage of the method at freezing temperatures. Such materials are well known and include typically the glycols, such as ethylene glycol and glycerine, and the lower water miscible alcohols, such as methanol and ethanol.

Other additives, such as dyes and pigments, heat and light stabilizers, preservatives and antioxidants, that are conventionally incorporated into latex formulation may be included in the latexes employed in the practice of the invention. It is an advantage of the present invention that such materials are not generally required.

Aqueous polymer latexes as sold commercially will usually have from about 40 to 50 weight per cent solids. If employed in this method such latexes will provide very little penetration into the surface and will tend to coat the exterior. Such a coating will provide some protection from erosion but is costly and is generally less desirable than the crust formation contemplated herein. It is preferred to dilute the latex by a factor of many times its original solids concentration. Thus, the latex formulation may have polymer solids as low as about 1% and function adequately.

The silicone utilized herein is a silicone which forms a hydrophobic coating on the particles of particulate or latex-coated particulate matter. Representative classes of useful silicones include, e.g. (a) dilute solutions of silicone resins in hydrocarbon solvents and (b) dilute aqueous solutions of siliconates. Desirably the silicone is one which forms a high contact angle with water, e.g. about 90° or more, and which, after evaporation of the carrier liquid, cures quickly into a hard film.

High contact angles are obtained when the substituent alkyl groups in the organic group attached to the silicon atoms are methyl rather than other alkyl groups or phenyl. Quick curing into a hard film is obtained when tri-functional materials, e.g. methyl trichlorosilane, are employed.

The silicone may be carried in a liquid in which the silicone is dispersible or soluble, e.g. water. Aqueous silicone water repellants sold commercially typically contain about 30 weight percent solids. For reasons of economy, it is preferred to dilute the silicone water repellent substantially by adding a liquid to obtain a silicone formulation.

The silicone formulation to be applied according to the practice of the present invention may contain solids in an amount as low as about 0.1 weight percent of the formulation and function adequately.

The surface susceptible to the beneficial practice of this invention include those of most any mass of particulate matter. The present treatment is particularly useful on hydrophobic surfaces such as those of mineral piles, e.g. coal, or oil soaked earth.

A mixture containing a combination of the organic polymer and the silicone is found to produce synergistically superior waterproofing. Many different combination ratios will be effective. For example, a mixture containing, by weight, 4 parts of an organic polymer and three parts of a silicone produces markedly improved waterproofing of iron sinter; see Example 1. A mixture containing 12 parts of organic polymer per one part of silicone also is highly effective; see Example 2. The mixture is effective even containing as little as about 1% polymer solids and 0.1% silicone, based on the total weight of the mixture.

In the practice of this method the organic polymer and the silicone may be applied to a surface to be treated as an aqueous mixture, such as by spraying, uniformly over the accumulation of particulate matter.

The preferred quantity of latex solids to be applied is from about 0.5 to 4 pounds per 100 square feet of surface although 0.2 pound has utility and 10 or more pounds may be used to obtain added strength. The preferred quantity of silicone solids is from about 0.05 to about 2 pounds per 100 square feet of surface, although about 0.05 to about 3 pounds of solids per 100 square feet of surface to be treated is a usable range.

It has been observed however, that with certain particulate materials reduced water seepage rates are obtained by sequential application of the organic polymer latex followed by a formulation of the silicone. Optimum results are obtained by applying an aqueous mixture containing a combination of the organic polymer and the silicone after the initial application of an organic polymer latex. Alternatively the surface may be treated initially with an aqueous mixture containing both an organic polymer and a silicone. It is important that the initial application be allowed to cure before another application is made to the same surface. This required curing period varies with the formulations employed and atmospheric conditions; a typical curing period is one day.

It is found that application of an organic polymer latex individually does not give waterproofing of sufficient permanence for many applications, such as sealing outdoor ore piles. It is found that application of a silicone formulation individually often fails to seal the particulate matter, because the silicone unable to wet certain surfaces, runs off of them without penetrating or attaching to such surfaces.

However, initial application of the organic polymer latex is thought to form a water-wettable supporting crust onto which the silicone will attach when applied to provide waterproofing.

The mixture used in the second application may contain various ratios of the organic polymer latex and the silicone formulation, but a mixture containing a combination of about 12 parts by weight of the organic polymer and about 1 part of the silicone yielded especially desirable results. The application procedure can be repeated as many times as necessary to effect the desired degree of waterproofing and strength of the crust. Example 3 sets forth the effects of sequential application.

A suitable applicator, e.g. a spraying apparatus, may consist essentially of a hose, pipe, or the like of suitable length and maneuverability provided with a nozzle or header at the outlet end and connected to a source of air under high pressure. The solution to be applied is forced through the hose and out the nozzle or header which is manipulated in such a way as to define a relatively uniform pattern of application to the accumulation or pile of finely particulate material to provide a substantially continuous coherent crust on the surface through binding of the particles together. A penetration of about 0.05 inch is adequate although the penetration of an average of as much as about 1 inch or more is often effectuated in loosely compacted materials. There is no maximum limit for the depth of penetration except that of economy of materials and time.

By use of this method it is possible to prevent wind erosion at wind velocities exceeding 95 miles per hour and to reduce water absorption by 95 percent.

In the following examples various particulate materials were treated with a latex and/or silicone formulation. A sample of a certain particulate material contained in a 10 × 3 × 1 inch tray was treated with one or more compositions; the initial application was allowed to cure before further applications or testing for water seepage or wind erosion. Water seepage was measured by tilting the test surface to a 40° angle, directing water across the surface, and noting the amount which seeped through the surface. Resistance to wind erosion was tested by exposing a treated sample to an air flow of a given velocity within a wind tunnel. The velocity at which erosion by air was observed was noted and its wind velocity equivalent determined.

EXAMPLE 1

A sample of iron sinter without treatment permitted a water seepage rate of 2.32 gallons per square foot per hour, as shown in Table I. When the iron sinter mass was treated with a combination of equal volumes of latex and silicone formulations (weight ratio of solids: 4 parts copolymer: 2.5 parts silicanate) water seepage was substantially eliminated, whereas when treated with either latex or silicone individually substantial seepage occurred.

In this example $L_1$ represents an aqueous formulation comprising by weight (a) 95% of a latex formulation which contains about 48 weight per cent solids (yielding 4 lbs/gal. solids), which solids are in the form of a copolymer formed by the interpolymerization of the reactants, by weight, 36.5% styrene, 60.0% butadiene, 2.0% acrylic acid, and 1.5% maleic anhydride and (b) 5% ethylene glycol. S represents an aqueous sodium methyl siliconate formulation containing 3 lbs/gal. sodium methyl siliconate solids. In each test $L_1$ and S formulations were each diluted in water to 5 volume per cent of their original concentrations to yield the "treating chemical" within the meaning of this example.

TABLE I

| Test No. | Formulation | Gallons Treating Chemical/ 100 Sq Ft | Weight Solids/ 100 Sq Ft (Pounds) | Water Seepage Rate (gal/sq ft/hr) |
|---|---|---|---|---|
| 1 | None | — | — | 2.32 |
| 2 | $L_1$ | 8 | 1.5 | 0.99 |
| 3 | S | 8 | 1.2 | 0.61 |
| 4 | 50% $L_1$ + | 8 | 0.8 | 0.04 |
| | 50% S | | 0.6 | |

EXAMPLE 2

A sample of iron sinter without treatment permitted water seepage at a rate of 0.94 gal/sq. ft/hr. Treatment with a latex lowered the rate to 0.10 gal/sq. ft/hr, but application of a combination of 9 parts by volume of a latex formulation and 1 part of silicone formulation (weight ratio of solids: 12 parts copolymer: 1 part siliconate) decreased the rate to 0.02 gal/sq ft/hr, a five-fold reduction of the rate attained by the use of latex formulation individually. $L_1$ and S are the same species defined in Example 1. However, in this example the $L_1$ and S formulations were each diluted in water to 10 volume percent of their original concentrations to yield the treating chemical within the meaning of this example. The results of Example 2 are tabulated in Table II.

TABLE II

| Test No. | Formulation | Gallons Treating Chemical/ 100 Sq Ft | Weight Solids/ 100 Sq Ft (Pounds) | Water Seepage Rate (gal/sq ft/hr) |
|---|---|---|---|---|
| 1 | None | — | — | 0.94 |
| 2 | $L_1$ | 6 | 2.3 | 0.30 |
| 3 | $L_1$ | 8 | 3.0 | 0.15 |
| 4 | $L_1$ | 10 | 3.8 | 0.10 |
| 5 | 90% $L_1$ + | 8 | 2.7 | 0.04 |
| | 10% S | | 0.24 | |
| 6 | 90% $L_1$ + | 10 | 3.4 | 0.02 |
| | 10% S | | 0.30 | |

EXAMPLE 3

The effect of sequential application of latex and silicone formulations to a coal sample is demonstrated herein. Untreated, the water seepage rate was 20.0 gal/sq ft/hr. Treatment with one latex alone gave a reduction in seepage rate to 13.75, and treatment with another latex alone gave a reduction to 10.25 gal/sq ft/hr.

However, a threefold reduction in seepage rate was attained by sequential application of the latex alone in which test the first application was allowed to cure before the second application was made.

Use of a combination of latex and silicone showed similar but more dramatic reductions in seepage rate. A combination of latex and silicone permitted only 1.88 gal/sq ft/hr seepage. However, a sequential application of the combination gave a seepage rate of 0.50 gal/sq ft/hr. Use of a more dilute solution in the first application allowed a seepage rate of only 0.12 gal/sq ft/hr. In the case of sequential applications the first application was permitted to cure before the second application was made.

In this example $L_2$ represents an aqueous formulation comprising by weight (a) 82.88% of a latex formulation which contains 48 weight percent solids (4 lbs/gal), which solids are in the form of the same copolymer contained in the $L_1$ formulation of Example 1, (b) 9.24% ethylene glycol, and (c) 7.88% of the adduct of one mole di-sec-butyl phenol and 10 moles ethylene oxide. $L_3$ represents an aqueous latex formulation containing 48 weight percent solids (4 lbs/gal), which solids are in the form of the above defined copolymer. S is the same formulation as defined in Example 1. In this example the $L_2$, $L_3$ and S formulations were volumetrically diluted to differing extents to obtain the treating chemical within the meaning of this example. The extent of dilution is indicated along with the results of these tests, which are shown in Table III.

TABLE III

| Test No. | Formulation | Gallons Treating Chemical/100 Sq Ft | Dilution of Formulation to Yield Treating Chemical (Volume Per Cent) | Weight Solids/ 100 Sq Ft (Pounds) | Water Seepage Rate (gal/sq ft/hr) |
|---|---|---|---|---|---|
| 1 | None | — | — | — | 20.0 |
| 2 | $L_2$ | 6 | 3% | 0.6 | 13.75 |
| 3 | $L_3$ | 1 | 25% | 1.0 | 10.25 |
| 4 | 1st appl. $L_3$ | 1 | 25% | 1.0 | 3.75 |
| | 2nd appl. $L_3$ | 1 | 25% | 1.0 | |
| 5 | 90% $L_3$ + | 1 | 25% | 0.9 | 1.88 |
| | 10% S | | | .075 | |
| 6 | 1st appl. | | | | |

TABLE III-continued

| Test No. | Formulation | Gallons Treating Chemical/100 Sq Ft | Dilution of Formulation to Yield Treating Chemical (Volume Per Cent) | Weight Solids/100 Sq Ft (Pounds) | Water Seepage Rate (gal/sq ft/hr) |
|---|---|---|---|---|---|
| | 90% $L_3$ | 1 | 25% | 0.9 | |
| | 10% S | | | .075 | |
| | 2nd appl. | | | | |
| | 90% $L_3$ | 1 | 25% | 0.9 | 0.50 |
| | 10% S | | | .075 | |
| 7 | 1st appl. | | | | |
| | 90% $L_3$ | 2.5 | 10% | 0.9 | |
| | 10% S | | | .075 | |
| | 2nd appl. | | | | |
| | 90% $L_3$ | 1 | 25% | 0.9 | 0.12 |
| | 10% S | | | .075 | |

EXAMPLE 4

A major oil refinery located on the Gulf Coast in Louisiana operates a salt water storage pit enclosed by a soil dike. Frequent heavy rains cause severe water erosion of this dike. A sample of the soil used in this dike was treated according to the practice of the present invention and markedly improved resistance to water erosion was noted. The soil tested contained primarily quartz, some feldspar, and a small amount of illite, dolomite, and calcite. The soil contained about 3.0% sodium chloride and was substantially coated with oil.

The treated surface was tested by dropping water droplets onto the surface from a height of four feet at a rate of 20 drops per minute. The time required to form a pockhole on the surface was determined. It will be seen from Table IV that treatment with a latex copolymer improved the resistance of the surface to water erosion, but that treatment with both the copolymer and a silicone effected a further, substantial improvement. It is further seen that the techniques of sequential application of organic copolymer and silicone and of simultaneous application of a mixture of the two species both improved the water erosion properties of the soil.

$L_4$ here represents an aqueous formulation comprising by weight (a) 79.6% of the latex formulation $L_3$, (b) 8.4% ethylene glycol, and (c) 12% of the adduct of one mole di-sec-butyl phenol and 10 moles ethylene oxide. S is the same formulation as defined in Example 1. As in Example 3, the dilutions to which the $L_4$ and S formulations were subjected varied and are shown along with the results of the tests in Table IV.

TABLE IV

| Test No. | Formulation | Gallons Treating Chemical/100 Sq Ft | Dilution of Formulation to Yield Treating Chemical (Volume Per Cent) | Weight Solids/100 Sq Ft (Pounds) | Time Required to Form Pockhole in Surface (min.) |
|---|---|---|---|---|---|
| 1 | None | — | — | — | .75 |
| 2 | $L_4$ | 5 | 10% | 1.6 | 86 |
| 3 | 1st appl. $L_4$ | 5 | 10% | 1.6 | >600 |
| | 2nd appl. S | 3 | 3% | .27 | |
| 4 | 1st appl. $L_4$ | 5 | 10% | 1.6 | >600 |
| | 2nd appl. S | 5 | 5% | .75 | |
| 5 | $L_4$ + | 5 | 10% | 1.6 | >600 |
| | S | | 5% | .75 | |

What is claimed is:

1. A composition suitable for use in protecting from environmental erosion, a surface of a pile or mass of finely divided particulate matter otherwise susceptible to erosion, which composition comprises: an aqueous-based suspension containing a. a film forming organic copolymer formed by the interpolymerization of, by weight, 36.5% styrene, 60% butadiene, 2% acrylic acid, and 1.5% maleic anhydride, and b. a silicone which forms a hydrophobic coating on a substrate, said composition containing the copolymer and silicone in amounts sufficient to cooperatively render such a surface resistant to environmental erosion when said composition is applied thereto in an effective quantity.

2. The composition of claim 1 wherein the weight ratio of copolymer:silicone in said liquid suspension is from about 12:1 to 1:1.

3. The composition of claim 1 wherein, based on the total weight of the composition, the copolymer is present in an amount of at least about 1% and the siliconate is present in an amount of at least about 0.1%.

4. The composition of claim 1 containing an effective amount of a latex stabilizing wetting agent.

5. The composition of claim 1 containing an effective amount of an antifreeze agent.

6. The composition of claim 1 wherein the silicone is one which forms a contact angle with water of at least about 90°.

7. The composition of claim 6 containing a latex stabilizing amount of a wetting agent characterizable as a condensation product of an alcohol or a phenol with from 5 to about 40 moles of an alkylene oxide.

8. The composition of claim 1 wherein the silicone is sodium methyl siliconate.

9. The composition of claim 8 wherein, based on the total weight of the composition, the copolymer is present in an amount of at least about 1% and the siliconate is present in an amount of at least about 0.1%.

10. The composition of claim 9 containing a latex stabilizing amount of an adduct of di-sec-butylphenol with 10 moles ethylene oxide.

11. The composition of claim 10 containing an effective amount of an antifreeze agent.

* * * * *